United States Patent
Higbee et al.

[11] 3,865,329
[45] Feb. 11, 1975

[54] INERTIAL LOCKING RETRACTOR

[75] Inventors: Wallace C. Higbee, Romeo; Howard A. Wilcox, Imlay City; Jay W. Jensen, Romeo, all of Mich.

[73] Assignee: The Firestone Tire & Rubber Company, Akron, Ohio

[22] Filed: June 1, 1972

[21] Appl. No.: 258,576

[52] U.S. Cl................................ 242/107.4, 74/576
[51] Int. Cl......................... A62b 35/00, B65h 63/04
[58] Field of Search.......... 242/107.4, 107 R, 107.3, 242/107.2; 280/150 SB; 297/385, 386, 387, 388; 74/576

[56] References Cited
UNITED STATES PATENTS

| | | | |
|---|---|---|---|
| 3,412,952 | 11/1968 | Wohlert et al.............. | 242/107.4 |
| 3,549,203 | 12/1970 | Rawson..................... | 242/107.4 |
| 3,659,801 | 5/1972 | Romanzi, Jr............... | 242/107.4 |
| 3,667,698 | 6/1972 | Fisher....................... | 242/107.4 |

Primary Examiner—John W. Huckert
Assistant Examiner—Jon W. Henry
Attorney, Agent, or Firm—Miller, Morriss, Pappas & Mcleod

[57] ABSTRACT

A retractor for seat belt harness and the like which responds to lock inertially on accelerated withdrawal of harness material such as belting. The inertial lock-up is the consequence of matched rotary ratchets, one comprising the flange of the storage drum and the other responsive to inertial differences in the rate of harness withdrawal and the two extremes of relative movement are from matched or synchronized ratchet registry and mis-matched or out-of-phase relation in respect to the ratchet teeth. A pawl element is provided and is biased toward blocking rotation of the spool and is barred from locking the ratchet when the out-of-phase condition exists between ratchets since the teeth crest in one ratchet bars access to the gap between teeth in the other ratchet. When match registry of teeth occurs as a consequence of the spool leading the inertial match plate or ratchet wheel, then the pawl can see the opening between teeth and lock the ratchets against further movement. A spring bias provides a resilient drive cushion as between spool and match plate and the spring bias acts to hold the ratchet elements and match plate in normal out-of-phase relation. The limits of arcuate movement between ratchet flange and match plate are to match position on one extreme of travel and full mis-match at the other position of travel. A disabling sensor is positioned to prevent the pawl element from engaging the ratchet elements until a predetermined amount of harness material has been withdrawn from the spool. A retractor motor is secured to the frame journalling the spool and is drivably secured to the spool applying a relatively constant return bias to the harness material unimpeded by the ratchet and pawl elements.

9 Claims, 7 Drawing Figures

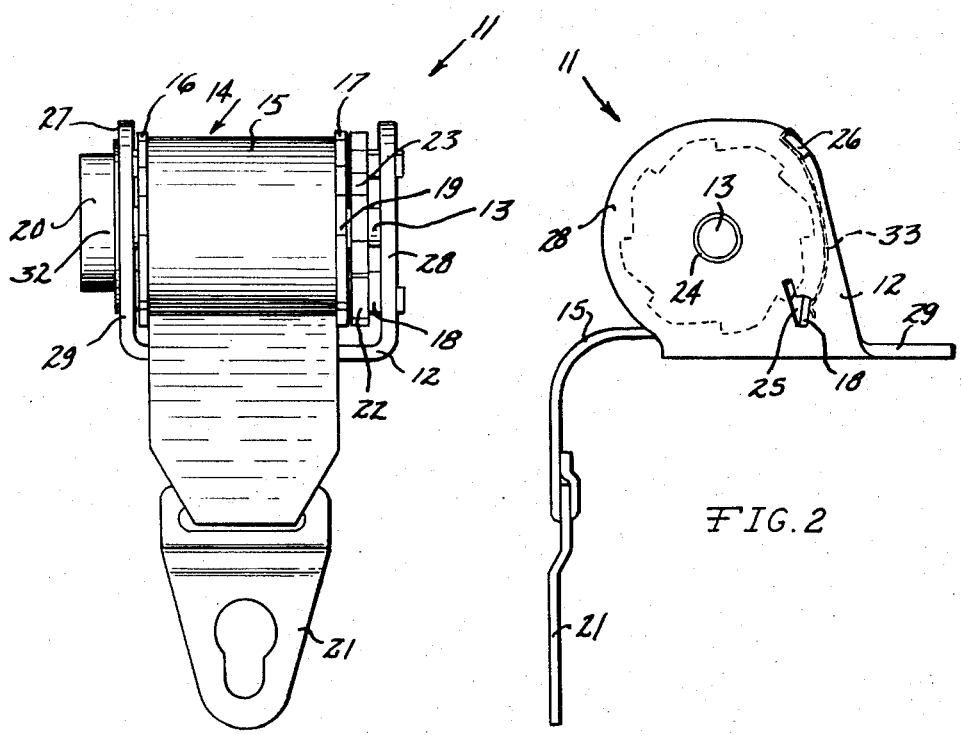
FIG. 1
FIG. 2
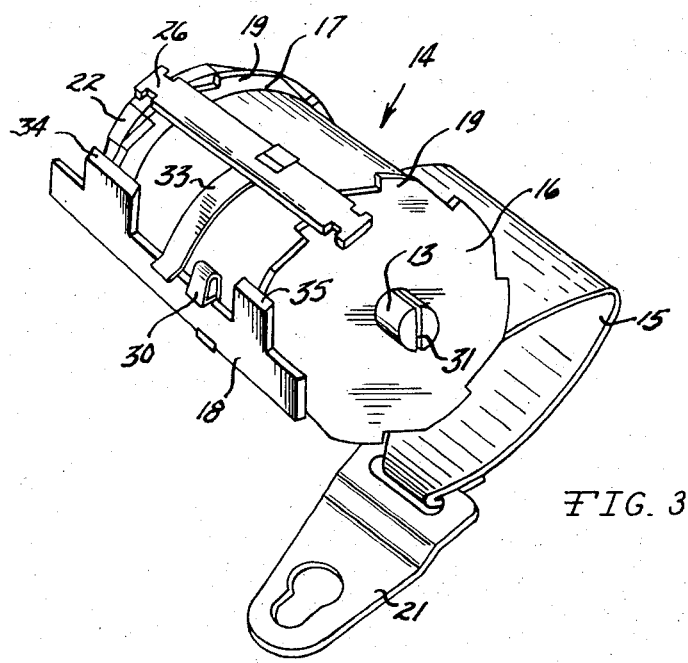
FIG. 3

INERTIAL LOCKING RETRACTOR

The present invention relates to an automatic locking retractor which winds up loose belting or cable in safety belt arrangements in automobiles, aircraft or other type vehicles, which locks against withdrawal by sensing inertial forces which are the consequence of rapid deceleration of the vehicle. The deceleration of the vehicle causes acceleration of a passenger or driver, for example, with consequent sudden withdrawal tendencies on belting or cable wound on a retractor receptacle. Under such emergency conditions, the retractor of the present invention locks the spool or drum against withdrawal and the harness or belting tautly resists the propulsion tendencies in the body of the passenger or the driver as the case may be. By reducing the number of elements in the retractor construction and by simplifying the inertial means to accomplish inertial lock-up, a new and improved inertial retractor is provided which is useful in many safety harness settings. A new inertia responsive lock is provided and a new lock disabling clip is presented.

An inertial reel for safety harness is desirable because it allows maximum freedom to the user to move about in the vehicle so long as his movements are smooth and below the acceleration sensitivity of the reel. Under emergency conditions as in stopping or collisions, then the acceleration of the body and attached harness is relayed to the reel and the inertial sensing structure allows an immediate locking against further withdrawal. The other major advantage of this type of retractor over "locker" type retractors is that the movement of the wearer does not result in a constant incremental tightening of the belt or harness. Inertial retractors or, more accurately, inertial locking retractors, have generally involved relatively complex clutch means, intricate releases, and rather high precision workmanship and machining to provide good and reliable performance over prolonged periods. The history of such devices goes back to the aircraft industry and aircraft type devices were redesigned then to admit of relatively inexpensive construction for use in the automotive industry. Centrifugal forces were utilized and inertial overrun forces were allowed to impart radial and axial forces to means causing pawls to engage ratchets and block against withdrawal of cable or belting.

The following United States Letters Patent generally characterize the prior art: Nordmark No. 2,701,693; Hoven et al. No. 2,843,335; Cushman et al. No. 3,018,065; Spielman No. 2,982,492; Wrighton No. 3,482,799; and Burns No. 3,568,948.

None of these devices propose a match plate flanking a ratchet flange whereby a pawl is blocked from entry to the pocket between ratchet teeth until an inertial imbalance occurs which causes the ratchet flange and match plate to registrably position in respect to each other. Thereupon the pawl element can drop into the pocket between the ratchet teeth and block further movement of the ratchet flange. Accordingly, the present invention admits of a new, useful and inventive construction which is compact, includes repetitive accuracy and performance over long periods of use, and may be calibrated for sensitivity and may be selectively disabled to operate through a fixed amount of withdrawal before the pawl element is armed or biased to engage the ratchet flange and match plate.

Another object is to provide an inertially sensitive safety locking retractor which is simpler than devices heretofore known.

Another object is to equally distribute locking stresses to a pair of ratchet flanges by use of a bar pawl element urged toward contact with the ratchet flanges and the match plate.

Another object is to teach a match plate structure for inertial blockage of a safety harness reel.

Other objects, including simplicity, obvious economy, and ruggedness for automotive usage will be appreciated as the description proceeds.

IN THE DRAWINGS

FIG. 1 is a front elevation view of an inertial locking retractor in accord with the present invention and seen from the side of the drum where withdrawal occurs.

FIG. 2 is a side elevation view of the retractor seen in FIG. 1 and in phantom line showing the profile of retractor and match plate.

FIG. 3 is a perspective view of the spool or drum and best indicating the normal out-of-register relation as between match plate and ratchet flanges of the drum. The bias urging the latch bar (pawl) toward closure with the ratchet flanges is indicated and the latch bar disabling element is also visible. In this figure, the rewind spring has been removed and the structure is shown separated from the frame or journal mounting.

Figure 4:
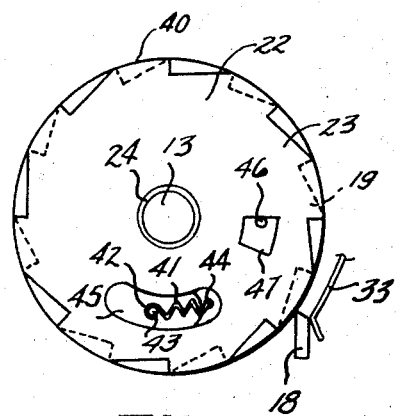

FIG. 4 is a profile view of the match plate and ratchet flange where the teeth on both are out-of-phase or register each with the other so that th latch bar cannot penetrate beneath the teeth to lock the drum or spool.

Figure 5:
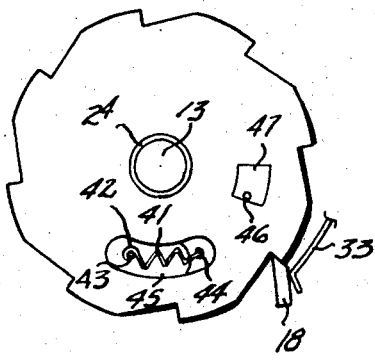

The FIG. 5 reveals the same structure as in FIG. 4 but in FIG. 5 the application of inertial forces from deceleration of the vehicle in which this device is installed cause accelerated or suden withdrawal of belting so that the teeth are matched in the match plate and ratchet flange and the locker bar or pawl can prevent further withdrawal.

Figure 6:
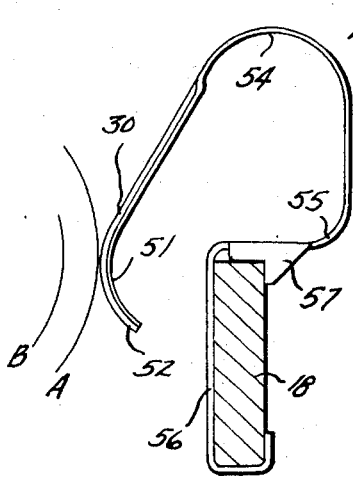

FIG. 6 is an end elevation view of a disabling clip selectively positioned on the lock bar for controlled monitoring engagement with belting or cable wound on the spool or drum.

Figure 7:
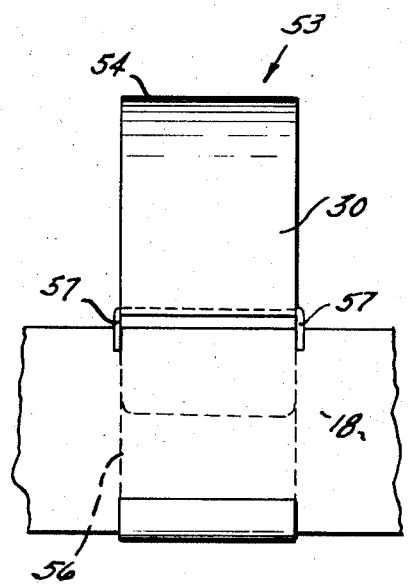

FIG. 7 is a rear elevation view of the structure seen in FIG. 6 and indicating the simplicity of the clip assembled on the pawl or lock bar.

GENERAL DESCRIPTION

In general a cable or belting receptacle is provided in the form of a spool or drum supported in a suitable frame. At least one of the flanges of the spool or drum is provided with ratchet teeth. A rewind spring motor is provided which biases the spool toward retraction at all times under a moderate and relatively constant spring force. The force is easily overcome by manual withdrawal of belting or cable spooled on the drum. A pawl element, preferred in the form of a bar, is supported in the frame and mounted parallel to the axis of the spool or drum and is offset therefrom and biased to tilt into blocking engagement with the ratchet flange.

At all times rewind is possible since the ratchet under rewind condition simply pushes the pawl out of the way. Coaxial and adjacent to at least one of the ratchet flanges of the drum is a match plate. The profile configuration of the match plate is substantially identical to the ratchet flange and the match plate is drivably connected to the ratchet flange. When the two are matched the synchronized teeth are all in register and when fully mis-matched or out-of phase the two sets of teeth present an uninterrupted disc-like profile.

The drive connection between the ratchet flange and match plate is through a lost motion link so that there are two extreme positions as between the match plate and the ratchet flange. One position is a registering or match position. The other position is a mis-match or out-of-phase position by an angular amount such that the teeth in the match plate block the intermediate openings between the teeth in the ratchet flange. A spring means biases the two elements of match plate and ratchet flange to mismatch so that the pawl or lock bar cannot enter the space between teeth in the ratchet flange. However, on a sudden (rather than a gradual) withdrawal of cable or belting, the spool inertially outruns the match plate whereupon the bias to mis-match is overcome and registry occurs as between match plate and ratchet flange. Then initial locking occurs. As rewind occurs, as a consequence of relaxation of force on the belting or cable, the pawl element is pushed out of lock engagement and the spring means between match plate and ratchet flange restores the mis-match condition.

In some instances it is desirable to disable the pawl through a predetermined amount of belting or cable withdrawal. This is to prevent premature inertial locking when the user initially strips belting from the reel or drum. In such instances a disabling clip is secured to the pawl or latch bar and it resiliently extends to selected contact with the spooled webbing or cable on the drum or spool. So long as the disabling clip is in contact with the webbing or cable the pawl is held out from contact with the surfaces of the match plate and ratchet flange. The disabling force is small and simply of a magnitude to overcome the small bias normally urging the pawl toward engagement with the ratchet. This allows accelerated removal of belting through a limited withdrawal distance without premature lock up. Once the disabling clip loses contact with the webbing or cable, however, the structure is armed to lock in the event of any sudden or accelerated withdrawal causing the drum and its ratchet flanges to register with the normally out-of-phase match plate.

The structure thus described is journalled in a suitable frame, usually channel shaped and the upstanding flanges form bearing supports for the spool and support the spring motor at one side. In some instances boots or covers are configured to cover and connect to the retractor reels and in some instances variations in the frame are made to accommodate particular positioning in a vehicle or the like. Usually the web portion of the channel-like frame provides the mounting base to the floor, door, ceiling, seat, or other structural element in the vehicle where the reels are to be mounted.

The harness can be varied as desired but usually comprises a buckle element which provides an element of a connection as between belt or cable on the drum and other belting which girdles or supports the driver or passenger of vehicles. The inertial reel device is simple, ruggedly durable, and relatively inexpensive to produce.

SPECIFIC DESCRIPTION

Referring to the drawings and most specifically to FIG. 1 thereof, the inertially locking retractor 11 of the present invention is shown. A base or frame 12 is provided which affords journalling support for the shaft 13 and the shaft connected reel drum or spool 14 on which safety harness material or webbing 15 is wound. The spool or reel 14 includes a pair of spaced apart ratchet faced flanges 16 and 17. The ratchet teeth of the ratchet faced flanges 16 and 17 provide a means for locking the drum or spool 14 against extension when the pawl or lock bar 18, supported tiltably in the frame 12, is urged to locking engagement with the teeth 19. A retractor motor 20 is connected to the frame 12 and is connected drivably to the shaft 13 and this motor 20 is of the spring type urging full retraction of the webbing 15. In the retraction direction of rotation, the teeth 19 avoid being engaged lockably by the pawl or lock bar 18. A buckle or harness element such as the tongue piece 21 is secured as by stitching to the terminal end of the webbing 15 and this tongue piece 21, upon withdrawal of webbing 15, can be suitably connected to remote buckle or harness receiver elements, not shown, so that the only resistance to the wearer's movement is the bias imposed by the retractor motor 20. However, as will be seen, against this bias the wearer, user or driver of an automobile is reasonably free to move so long as his movements are reasonably gradual and not too abrupt. A match plate 22 is provided on the shaft 13 and is not secured thereto so that its motion is limited by other means than the shaft 13, as will be seen. The teeth 23 are profiled to substantially match the teeth 19 on the ratchet flanges 16 and 17 so that when the teeth 23 of the match plate 22 and the teeth 19 of the ratchet flanges 16 and 17 are synchronized or in-phase or register with each other, the pawl or lock bar 18 can lockably engage the teeth, but when the match plate 22 is out-of-phase or out of synchronized with the adjacent ratchet flanges 16 and 17, the lock pawl 18 is unable to lockably engage the teeth 19 and 23 since the teeth 23 crest to block access to the pockets of teeth 19 and hence block locking access. This will be best understood as the description proceeds by reference to the FIGS. 3, 4 and 5. In the FIG. 1, the drive linkage between the ratchet flange 17 and the match plate 22 cannot be seen but will be appreciated as the description proceeds.

FIG. 2 shows the inertial locking safety belt harness retractor 11 of FIG. 1 in profile and the frame 12 is best seen supporting the shaft 13 in the bearing 24 and the profile of the match plate 22 or ratchet flanges 16 and 17 are seen in phantom-line. The pawl or lock bar 18 is also seen in the arcuate slot 25 and will be seen to tilt toward and away from contact with the teeth 19 or 23. The spacer bar 26 spans and rigidifies arms 27 and 28 of the channel shaped frame 12 and the frame-connected intermediate web 29 provides means for connecting the retractor 11 to the floor, bench roll bars or other structural part of vehicles not shown as by bolting, welding or otherwise. It will also be appreciated that the frame 12 can be varied in size, shape and configuration to meet particular installation requirements, support boots or shrouds, and to adapt itself to particular locations within a vehicle. The spacer bar 26, as will be seen, provides a convenient support for a latch lock or pawl bar spring bias. In the FIG. 2 it will be noted that locking can only occur on extension or withdrawal of belting 15 because the blocking sense of the teeth is then aimed at the pawl element 18. On retraction, the webbing or belting 15 is spooled up in accord with the action of the retractor motor 20 and the pawl element 18 is easily brushed aside against the relatively light pawl bias urging the pawl element 18 toward the ratchet flanges. In extension, the drum or spool 14 and shaft 13 moves in a clockwise direction (as viewed in FIG. 2) and in retraction the drum or spool rotates in a counterclockwise relation (as viewed in FIG. 2).

In the FIG. 3, the drum or spool 14 with its ratchet flanges 16 and 17 has been removed from the flange 12 and turned around from the FIG. 2 presentation so that the pawl or latch bar 18 is revealed in its biased relationship and a sensor 30 has been secured to the bar 18. The match plate 22 is disposed on the far side of the drum 14 adjacent the ratchet flange 17. The retractor motor 20 has been removed but the drive slot 31 in the shaft indicates the preferred connection of the spring motor 20 to the shaft 13. The opposite end of the shaft is secured to the flange faced motor cover 32 shown best in FIG. 1. This houses a coil spring well known in the art which stores energy on retraction. The webbing 15 and buckle element 21 are shown to assist in orientation.

A spring 33 is secured to the bar 26 and extends therefrom to apply a bias against the pawl bar 18 in a direction which urges it toward locking against the ratchet flanges 16 and 17. The sensor element 30 straddling the bar 18 extends toward engagement with webbing 15 on the spool 14 and thus provides a means to disable contact of the bar 18 at its lugs 34 and 35 with the ratchet teeth 19 and 23 until a predetermined amount of harness webbing 15 has been withdrawn. Thereafter, whether or not locking occurs, depends upon the inertial sensing and positioning of the flanges 16 and 17 and the match plate 22. If a mis-match of teeth exists, then the pawl 18 and its lugs 34 and 35 cannot lock because the match plate 22 and its teeth 23 bar entry of the pawl 18 between the teeth 19. However, if a match or registry occurs as between profiles of the ratchet flanges 16 and 17 and match plate 22, then locking does occur and the pawl element 18 can reach the teeth 19. In the FIG. 3 the relation between the similarly profiled match plate 22 and the adjacent ratchet flange is a mis-match or a lack of registry by an amount equal to the angular distance between the crest and root portions of the teeth 19 and 23. It will be seen that this is the normal relationship, under a fixed bias, of the two ratchet faced elements 17 and 22. It is thus seen in the FIG. 3 that the pawl dogs 34 and 35 cannot effectively lock the spool 14 because the bar 18 cannot gain access to the teeth 19.

The inertial sensing control as between the two extreme positions of the match plate 22 in relation to the flange 17 is best understood by reference to FIG. 4 which shows the teeth 19 and 23 in mis-matched normal relationship, the teeth 19 and 23 forming together a relatively unbroken perimeter 40 (as seen in profile). The spring element 41 is secured at one end 42 to the post 43 (which extends outward from the flange 17) and at the other end 44 the spring element 41 is secured to the match plate 22 in the arcuate opening 45 through the match plate 22. Consequently, the spring 41 maintains a normal mis-match of the teeth 19 and 23. A limit drive pin 46 extends from the end of the ratchet flange 17 and into an arcuate slot 47 in the match plate 22. The pin 46 serves as a stop limit. Since the match plate 22 is otherwise free to rotate on the shaft 13, the spring bias applied by the spring element 41 as between ratchet flange 17 and match plate 22 causes the positioning as seen with the drive pin 46 normally in the position as seen. However, accelerated withdrawal of belting or webbing 15 caused, for example, by sudden displacement of the passenger or user of harness connected to the retractor 17 will cause a sudden change of condition because the spool connected ratchet flange 17 will then exceed the inertial condition of the match plate 22 so that the tension spring 41 will become distended and the limiting drive post 46 will allow limited relative movement between the match plate 22 and ratchet flange 17 so that the teeth 19 and 23 are running in profile registry as seen in FIG. 5. As seen in FIG. 5 the pawl bar 18 can then tilt into blocking engagement with the now registering teeth 23 and 19 on the match plate 22 and the ratchet flanges 16 and 17 and thus providing an excellent and simple inertial locking system as the match plate 22 lags behind the ratchet flange 17 by an angular displacement enough to move from complete mis-match of teeth to complete registry or synchronization of teeth. This profile registry permitting lock-up is seen in the FIG. 5. It will be appreciated that FIGS. 4 and 5 are somewhat stylized and fragmental to appropriately show the inertial function.

FIGS. 6 and 7 illuminate the sensor 30 on the pawl or latch bar 18 and which sensor 30 is configured from spring stock as berylium-copper to provide a resilient engagement against the webbing 15 on the reel 14 (FIG. 3) so as to disable the inertial lock previously described through a selected amount of withdrawal of webbing 15 since the bias applied to the pawl or lock bar 18 is contra to the force applied by the light closing bias on the pawl 18 as indicated by the spring means 33. This disability to lock continues until the sensor spring clip 30 unloads to webbing radius A as shown. As more webbing is withdrawn between radius A and radius B, the bar 18 can tilt (counterclockwise as shown) and lock against the ratchet flanges 16 and 17 provided only that an acceleration is inertially sensed in excess of the setting of the spring 41. This allows the user of harness connected with this retractor 11 to move with reasonable freedom below the set acceleration condition. When the sensor 30 is used during the initial withdrawal of belting to the point where the sensor 30 is no longer engaged with the webbing 15, the user may initially accelerate withdrawal without risking lock-up. After the selected harness material has been withdrawn, the inertial lock takes over. The sensor 30 is formed from a simple stamping and comprises a feeler nose 51 on the open end of a loop of flat stock as shown and a slight convexity 52 is provided along the nose 51 to minimize wear of the belting 15. The open loop portion 53 drops down a convenient pair of radii 54 and 55 to include a bar encircling extension 56 with fold down stabilizer support wings 57 which hold the bar 18 in stable rectangular grip when combined with the turned in portion 58 which wraps itself beneath the bar 18. Thus, when the nose is in engagement with the webbing 15, the force in the sensor 30 and loop 53 is transmitted to the latch or pawl bar 18 to overcome the bias of spring element 33. The spring clip-sensor 30 is easily adjusted to accommodate to a variety of retractor reel and lock situations since in some instances it is desired to use the inertial lock capabilities through all withdrawal positions. In such cases, the clip 30 is easily removed and may be utilized on other pawl bar locking units.

OPERATION

In operation, the retractor thus described is smooth, quiet, and stable for repetitive calibrated accuracy in use. The device accommodates itself to a wide range of harness situations where the user desires normal freedom of movement in the vehicle but desires instantaneous lock-up under emergency situations consequent to fast braking, impacts and the like. The parts are simple to fabricate using stampings and the inertial usage of the match plate 22 removes any unusual tolerance limits since the only close tolerance requirement is in relation to the synchronization or registry of tooth profile. The spring means 41 and the drive stop means 46 are hidden from direct view and cannot be easily fouled and the retractor is adaptable to covering with an acceptable vinyl boot (not shown) in avoidance of entry of debris to the mechanism. The stop limit structure allows the mechanism to be directly adapted to limit switches monitoring the conditions in the retractor 12 as between the two exremes of ratchet flanges 16 and 17 and the match plate 22. Other features of simplicity will be readily appreciated by manufacturers of inertial locking reel or retractor devices.

Having thus disclosed our invention by revealing a complete and operative construction utilizing the invention, others skilled in the art will readily appreciate improvements, changes, modifications, and adaptation of the invention. Such improvements, changes, modifications and adaptations of the invention are intended to be included herein limited only by the scope of out hereinafter appended claims.

We claim:

1. An inertial locking retractor comprising:
   a frame;
   a retractor spool rotatably supported on said frame and on which harness material is retractably stored and from which harness material is withdrawn, and at least one of the end flanges of said spool including ratchet teeth;
   a match plate coaxially adjacent said spool and having ratchet tooth configuration substantially identical with said ratchet teeth on said spool and said match plate driven by said spool upon withdrawal of said harness in a normal position where said teeth on said match plate and on said spool are out-of-profile register, and on accelerated withdrawal of harness said teeth are moved to in-profile register; and
   a pawl element operably and tiltably supported on said frame and biased toward contact with said ratchet teeth and lockably engaging said ratchet teeth when said teeth are in-profile register.

2. An inertial locking retractor for seat belt harness and the like comprising:
   a frame;
   a shaft on said frame having harness would thereupon and a means to bias said harness to full retraction;
   a flange on said shaft and said flange having peripheral ratchet teeth;
   a match plate on said shaft having peripheral ratchet teeth matching said ratchet teeth on said flange and said match plate driven by said flange in-profile register with each other and in profile non-register;
   a drive connection between said flange and said match plate normally maintaining an out-of-register relation as between said teeth on said flange and said teeth on said match plate and on acceleration of withdrawal of said harness shifting said teeth to profile register;
   a resilient element in said drive connection urging said flange and said match plate to move together and when said resilient element is depressed moving said teeth in said flange and said match plate to profile registry; and
   a pawl element biased toward said ratchet teeth and lockably engaging said teeth when said flange and said ratchet plate are in-profile register.

3. An inertial lock for retractor spools such as used in seat belt harness applications comprising:
   a frame rotatably supporting said spool;
   a flange coaxial with a retractor spool and rotatable therewith, said flange having peripherally extending ratchet teeth;
   a match plate having ratchet teeth substantially identical to the tooth configuration to the ratchet teeth of said flange and coaxial with and adjacent to said ratchet flange;
   a drive connection including spring means between said flange and said match plate, said spring means providing a bias between said ratchet flange and said match plate, said spring means urging said match plate to an out-of-register tooth profile position in respect to said ratchet flange, and the bias of said spring means, then overcome, driving said flange and said match plate in a registered tooth profile position; and
   a pawl supported by said frame and urged toward relative tangential engagement with siad ratchet flange and barred from locking engagement with said ratchet teeth when said teeth are out-of-register in said ratchet flange and said match plate.

4. The combination as set forth in claim 3 and including:
   a disabling means extending from said pawl into selected contact with harness on said spool whereby said pawl bar is held out of contact with said ratchet elements until a predetermined amount of said belting has been withdrawn from said spool.

5. An inertial locking retractor structure for seat belt retractors comprising:
   a retractor frame;
   a pair of ratchet faced elements of identical profile, one of said ratchet faced elements being a flange on a harness material spool and the other of said ratchet faced elements being rotatable by the first mentioned ratchet faced element to one of two arcuate positions, relative to said first mentioned ratchet faced element, the first position where the ratchets of said elements are in-profile register, and the second position where said ratchets of said elements are wholly out-of-profile register;
   a pawl element biased toward tangential engagement with both of said ratchet faced elements but lockably engaging said ratchets only when said ratchets of ratchet faced elements are in-profile register with each other and barred from lockably engaging said ratchets when said ratchet faced elements are in out-of-profile ratchet register relation; and
   spring means acting between said ratchet faced elements urging said two ratchet faced elements to out-of-profile ratchet register relationship.

6. In the structure of claim 5, the added element of a harness sensor element on said pawl element holding said pawl away from contact with said ratchet elements through a selected amount of withdrawal of harness.

7. An inertial locking retractor comprising:
a frame;
a shaft journalled in said frame;
a spool having at least one end flange with a peripheral ratchet face and secured on said shaft for rotation therewith;
harness support material wound on said spool and secured thereto;
a retractor motor secured to said frame and operably connected to said shaft urging said harness material to wound condition on said spool;
an inertial wheel having a ratchet profile substantially identical to said peripheral ratchet face on said end flange of said spool and means limiting the relative rotation between said inertial wheel and said end flange;
resilient bias means acting between said end flange and said inertial wheel and urging said ratchet profile on said wheel to an out-of-profile register position with said ratchet face on said flange; and
a latch bar supported in said frame and biased toward contact with said end flange and said wheel, said latch bar lockably engaging said ratchets when said resilient bias means between said end flange and said inertia wheel is overcome by sudden withdrawal of said harness material from said spool.

8. An inertially locking seat belt retractor structure for use with seat belt harness and the like and responsive to accelerated withdrawal of harness material, the combination comprising:
a frame;
a shaft journalled in said frame;
a spool secured to said shaft and rotatable therewith, said spool including a pair of end flanges having peripheral ratchet faces;
a pawl bar rockably mounted in said frame toward and away from locking engagement with said flanges on said spool;
a spring urging said pawl bar toward locking engagement against said end flanges;
an inertial wheel having peripheral ratchet teeth substantially identical to the ratchet teeth of said end flanges and means limiting the relative rotation between said inertial wheel and at least one of said end flanges;
said means comprising an arcuate slot defined in one of said end flanges and said wheel and a drive pin extending from one of said end flanges and into the arcuate slot whereby as said spool moves said wheel also is driven;
a spring means secured at one end to said spool and at the other end to said inertial wheel whereby said ratchet teeth on said wheel and on the adjacent of said end flanges are biased to an out-of-registry ratchet profile position and preventing said pawl bar lockably from engaging said ratchets except as accelerated withdrawal of harness occurs and said spool is thereupon urged to exceed the bias of said spring secured to said spool and said drive pin moves in said slot to a second extreme position overcoming the bias of said spring and causing said ratchet elements in said wheel and said adjacent end flange to match each other whereupon said pawl bar has engagement access to said teeth of said ratchets.

9. An inertial locking retractor sensitive to accelerated withdrawal of harness webbing therefrom comprising:
a frame;
a retractor spool in said frame having at least one peripherally toothed ratchet flange;
a pawl element supported by said frame and tiltable toward and away from spool;
spring means urging said pawl toward engagement with said teeth of said ratchet flange;
a match plate having a substantially identical and registrable tooth configuration to said toothed ratchet flange of said spool and adjacent to said ratchet flange and coaxially driven by said ratchet flange;
spring means acting between said retractor spool and said match plate to urge said match plate to a normal position blocking access of said pawl to said ratchet flange by said pawl and said spring means yielding to sudden acceleration of said spool;
stop means as between said spool and said match plate stopping said match plate in registry position with said ratchet flange whereby said pawl engages said ratchet flange and stops withdrawal rotation of said spool; and
a webbing sensor secured to said pawl and biasing said pawl out of tiling engagement with said ratchets until a predetermined amount of harness is withdrawn from said spool.

* * * * *

UNITED STATES PATENT OFFICE
CERTIFICATE OF CORRECTION

PATENT NO. : 3,865,329
DATED : 1975 February 11
INVENTOR(S) : Wallace C. Higbee, Howard A. Wilcox, Jay W. Jensen It is certified that error appears in the above-identified patent and that said Letters Patent are hereby corrected as shown below:

Attorney, Agent or Firm, "Mcleod" should read --- McLeod ---

Column 1, line 6, before "which" insert --- and ---

Column 2, line 36, change "suden" to read --- sudden ---

Column 3, line 19, change "initial" to read --- inertial ---

Column 4, line 34, change "synchronized" to read --- synchronization ---

Column 5, line 8, change "flange 12" to read --- frame 12 ---

Column 7, line 21, after "two" insert --- angular ---

Column 7, line 21, change "exremes" to read --- extremes ---

Column 7, line 31, change "out" to read --- our ---

Column 7, line 58, change "would" to read --- wound ---

UNITED STATES PATENT OFFICE
CERTIFICATE OF CORRECTION

Patent No. 3,865,329     Dated February 11, 1975

Inventor(s) Wallace C. Higbee, Howard A. Wilcox, Jay W. Jensen

It is certified that error appears in the above-identified patent and that said Letters Patent are hereby corrected as shown below:

Column 8, line 28, change "then" to read --- when ---

Column 8, line 32, change "siad" to read --- said ---

Column 9, line 20, change "inertial" to read --- inertia ---

Signed and sealed this 24th day of June 1975.

(SEAL)
Attest:

RUTH C. MASON
Attesting Officer

C. MARSHALL DANN
Commissioner of Patents
and Trademarks